United States Patent [19]

Bailey

[11] 4,289,256
[45] Sep. 15, 1981

[54] TRAMLINING DEVICE FOR SEED DRILL

[75] Inventor: Alfred J. Bailey, Coventry, United Kingdom

[73] Assignee: Massey-Ferguson Services N.V., Curacao, Netherlands Antilles

[21] Appl. No.: 80,899

[22] Filed: Oct. 1, 1979

[30] Foreign Application Priority Data

Oct. 7, 1978 [GB] United Kingdom ............... 39713/78

[51] Int. Cl.³ ................................................ A01C 7/18
[52] U.S. Cl. ....................................... 222/52; 239/172; 222/611; 222/625; 222/486; 111/25
[58] Field of Search .................................... 111/25–33; 239/67, 99, 172; 222/1, 52, 611, 624, 625, 484, 486

[56] References Cited

U.S. PATENT DOCUMENTS

| | | | |
|---|---|---|---|
| 3,584,788 | 6/1971 | Lloyd | 239/172 |
| 3,606,264 | 9/1971 | Rosselot | 222/611 X |
| 3,622,253 | 11/1971 | Horton et al. | 111/25 X |
| 4,023,707 | 5/1977 | Johnson | 111/33 X |

Primary Examiner—David A. Scherbel
Attorney, Agent, or Firm—William R. Nolte

[57] ABSTRACT

A tramlining device is provided for a seed drill having shutters associated with respective seed spouts and controlled by individual fluid pressure operated actuators for improved flexibility in selecting the tramline spacing. The actuators are preferably such that when pressurized they close the shutters to produce tramlines. Fluid pressure is tapped from the rams that force the coulters into work. Preferably, a control valve in the fluid supply line comprises a valve member that is urged closed by the supply pressure but is opened by a plunger controlled by a bout register. Preferably, a solenoid operated plunger is provided to override operation of the bout register.

13 Claims, 12 Drawing Figures

TRAMLINING DEVICE FOR SEED DRILL

This invention relates to tramlining devices for use on drills used to sow seed and/or deposit similar granular material such as fertilizer granules.

Such devices are already available to prevent the discharge of seed from selected spouts of a drill to leave unsown rows on selected bouts during the sowing of a field. These unsown rows form so-called tramlines in the ultimate crop and provide convenient reference points for the subsequent driving of a tractor through the crop for various crop treatments such as the spreading or spraying of fertilizer or insecticide.

Automatic tramlining devices have been proposed, hereinafter referred to as being "of the aforesaid type", which comprise bout registering means for registering a number of successive bouts, indexing means responsive to changes between successive bouts and operative to index said bout registering means automatically between successive registered bout numbers, inhibiting means arranged to be changed between an inoperative state in which the discharge of seed or other granular material is permitted from one or more associated drill spouts and an operative state in which such discharge is inhibited, and linkage means which responds to selected bout numbers registered by said bout registering means to change the state of said inhibiting means.

In one automatic tramlining device of the aforesaid type, mechanical indexing means is provided which is responsive to raising and lowering of a drill that is mounted on the rear lift arms of a tractor and which indexes a mechanical bout counter each time the drill is raised out of work. The counter in turn controls operation of hydraulic linkage means including a hydraulic actuator that operates predetermined spring loaded shutters so that they are closed to produce tramlines during preselected bouts. The actuator has a fluid connection from the hydraulic actuator operating the tractor lift arms, and a valve is provided in this connection that is controlled by the counter so as to open the connection for tramlining. The lift pressure from the lift arm actuator operates the shutter actuator to open the shutters when not tramlining, this pressure being retained in the shutter actuator by subsequent closure of the control valve but being released by opening of the valve for tramlining. The shutter actuator is therefore pressurized to open the shutters when not tramlining and is de-pressurized for tramlining.

This known tramlining device suffers from a number of disadvantages. One important disadvantage is that it lacks flexibility in that predetermined shutters are operated by the one hydraulic actuator to effect tramlining at a predetermined tramline spacing. It is not possible therefore to produce tramlines at any other tramline spacing.

Another disadvantage arises from the fact the arm lift pressure is used to operate the shutter actuator and is retained therein when not tramlining. Should this pressure decrease due to leakage of hydraulic fluid then the actuator may release to close the shutters and produce tramlines when they are not needed.

Yet another disadvantage lies in the fact that the counter is necessarily operated each and every time the drill is raised by operation of the lift arms, and if this is done during a bout to avoid an obstruction or perform a manoeuvre then the bout number registered is advanced by one and the periodicity of the tramlining sequence is disrupted. This can only be avoided by further raising and lowering the drill until the registered bout number is re-cycled to the correct number.

The aim of the present invention is to provide an automatic tramlining device in which the aforesaid disadvantages are reduced or eliminated.

According to one aspect, the invention consists in a tramlining device of the aforesaid type for use on a plurality of spouts each with its own inhibiting means, in which the linkage means includes a separate fluid pressure operated actuator to change the state of each inhibiting means, and valve means controlled by the bout registering means for supplying pressurized fluid to and exhausting fluid from said actuator at selected registered bout numbers. Because each spout is provided with its own actuator it is a simple matter to provide any number of spouts with actuators and to make fluid pressure connections to those necessary for tramlining at any particular tramline spacing.

According to another aspect, the invention consists in a tramlining device of the aforesaid type in which the linkage means includes at least one fluid pressure operated actuator that is adapted to change the inhibiting means into its operative state when subjected to pressurized fluid, biasing means acting to return the inhibiting means to its inoperative state when the actuator is depressurized. In use, on a drill with hydraulically operated coulters, fluid pressure to operate the actuator is supplied from the coulter actuators. The actuator is therefore positively operated to effect tramlining, and pressure failure allows the biassing means to act upon the inhibiting means to stop tramlining. The device is therefore fail-safe in the sense that tramlines are not needlessly produced.

According to a still further aspect, the invention consists in a tramlining device of the aforesaid type in which the linkage means includes at least one fluid pressure operated actuator which, when pressurized with fluid at a working pressure level, changes the state of the inhibiting means from one state to the other; valve means controlled by the bout registering means for supplying fluid to and exhausting fluid from said actuator at selected registered bout numbers, said valve means including a valve seat across which the flow of fluid to and from said actuator takes place, a valve member arranged to be acted upon by fluid passing to the actuator so as to be moved toward said seat by such fluid, and a plunger separated from the valve member and arranged to be displaceable by the indicating means to unseat the valve member to allow the flow of pressurized fluid to the actuator; and biassing means arranged to effect the reverse change of state to that effected by the actuator by forcing fluid from the actuator when the level of pressure supplied by the valve means to the actuator falls from said working level.

In a preferred construction the line of action of the movement of the plunger is approximately normal to that of the valve member. Also the valve member is preferably provided with a conical portion which cooperates with the valve seat which is also of corresponding conical form. The valve member is also preferably spring biassed towards the valve seat.

According to a still further aspect, the invention consists in a tramlining device of the aforesaid type which includes a solenoid operated over-ride mechanism which when operated prevents the indexing of the bout registering means in response to said changes between successive bouts. Preferably, said changes between successive bouts is the raising of the coulters out of their working positions.

Such a tramlining device enables the drill operator to raise the drill coulters, for example, to negotiate an obstacle in the field during a particular bout, without indexing the bout registering means and hence throwing out the operation of the inhibiting means from the desired sowing pattern. If such an obstacle is encountered the operator simply operates the override means and then raises the drill coulters from their working positions to negotiate the obstacle. This raising of the coulters does not then index the bout registering means onto the next step and the coulters can simply then again be lowered into their working positions when the obstacle has been negotiated and the override means deactivated so that the bout can be continued without any change in the position of the bout registering means. Clearly without such an override means the bout registering means would simply index onto the next step each time the coulters were raised whether this was at the end of a bout or part way along a bout.

The invention also provides a seed drill fitted with a tramlining device in accordance with any of the above described aspects of the invention.

One embodiment of the present invention will now be described, by way of example only, with reference to the accompanying drawings in which.

Figure 1:
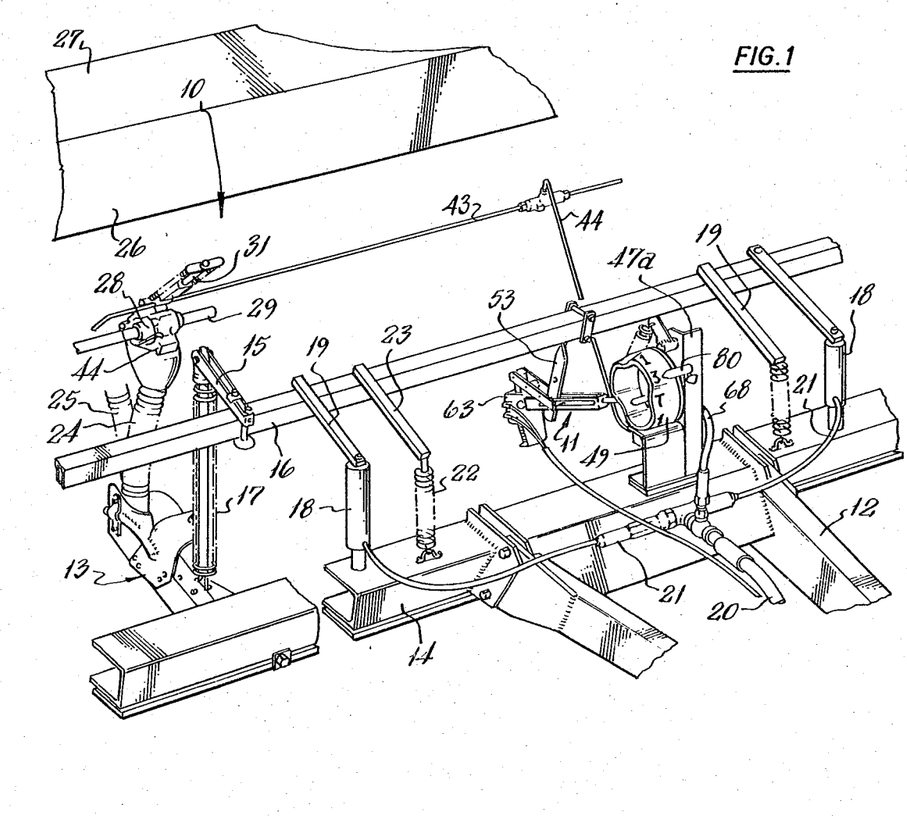
FIG. 1 shows part of a seed and fertilizer drill fitted with a tramlining device embodying the present invention.

Referring to the drawings part of a four meter wide seed and fertilizer drill 10 is shown schematically in FIG. 1. The drill itself is of a known design and is fitted with a tramlining device generally designated 11 in accordance with the present invention.

The drill is mounted on two wheels (not shown) positioned one at each side and is arranged to be drawn by a towing bar 12 which is provided with a connection for a tractor or similar other towing vehicle.

The drill is provided with a plurality of coulter assemblies 13 which are pivotally mounted at their front ends on a cross-bar 14 of the drill for pivoting in a substantially vertical plane under the action of an arm 15 mounted on a cross-shaft 16 and a compression spring 17 acts between an abutment associated with the arm 15 and the coulter assembly. In a known manner the coulter assemblies 13 are arranged to be pivoted downwardly into their working positions by the operation of two hydraulic cylinders 18 which are connected with the cross-shaft 16 via arms 19. The cylinders 18 receive pressurized fluid from the tractor via a line 20 and branch lines 21. The arrangement is such that on pressurization of the cylinders 18 the cross-shaft 16 is rotated in an anti-clockwise sense as viewed in FIG. 1 thus pressing the arms 15 downwardly and hence transmitting the downward force to the coulter assemblies via the compression of springs 17. The coulters are arranged to be automatically raised out of their working position when the cylinders 18 are depressurized. This raising is effected by tension springs 22 which act between the cross bar 14 and arms 23 carried on the cross-shaft 16.

Each coulter assembly 13 has associated therewith two discharge spouts, a forwardly positioned seed discharge spout 24 and a rearwardly positioned fertilizer discharge spout 25. These spouts are fed in a conventional manner from seed and fertilizer hoppers 26 and 27 respectively. The discharge of seed and fertilizer from each of the spouts is metered in the known manner by individual metering or feed wheels 28.

All the feed wheels associated with the seed spouts being driven from a common transversely extending shaft 29 driven from the drill wheels while the feed wheels associated with the fertilizer spouts are driven in a similar fashion from a similar shaft. As is known in such seed drills the drive to the feed wheels is arranged to be disconnected when the coulters are raised out of their working position thus preventing unwanted discharge of seed and fertilizer.

Between each feed wheel 28 and its associated hopper is positioned a slidable shutter which can be slid into a position to block off the supply of seed or fertilizer to the associated feed wheel should the farmer wish to reduce the effective width of the drill or block off certain coulters to achieve a particular planting pattern.

Thus far described the drill is of known construction, the reader being directed to our British Pat. No. 1,274,673 if a more detailed description of the construction and operation of the feed wheels 28 is desired.

As indicated above, the present invention is concerned with the provision of a tramlining device 11 which enables the seed and fertilizer spouts associated with selected coulter assemblies to be automatically shut off from the seed and fertilizer hoppers on selected bouts during the sowing of a field.

Figure 2:
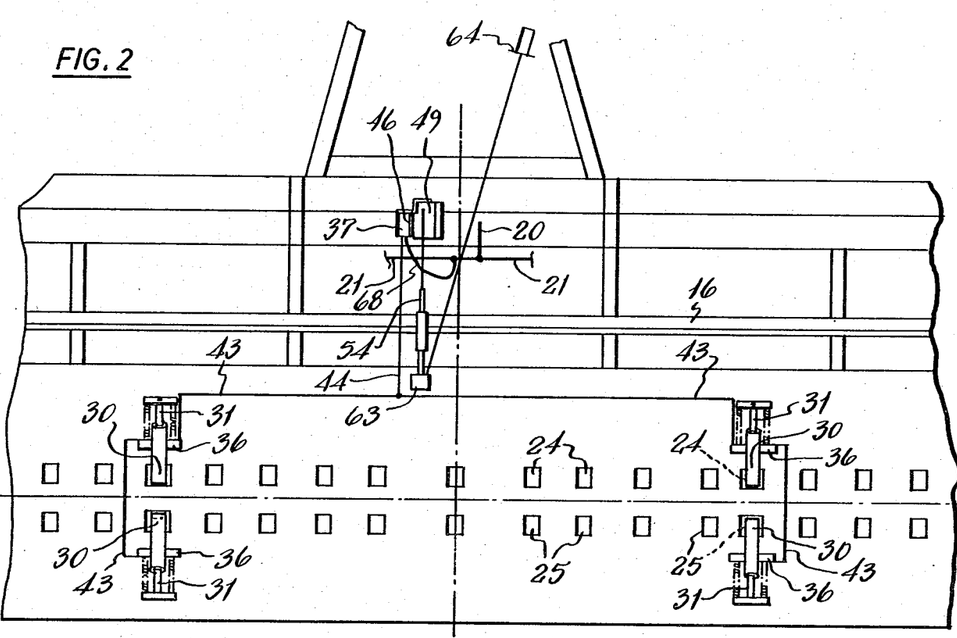
FIG. 2 is a general schematic plan view of part of the drill of FIG. 1 showing the hydraulic connections of the tramlining device in more detail.
Figure 9:
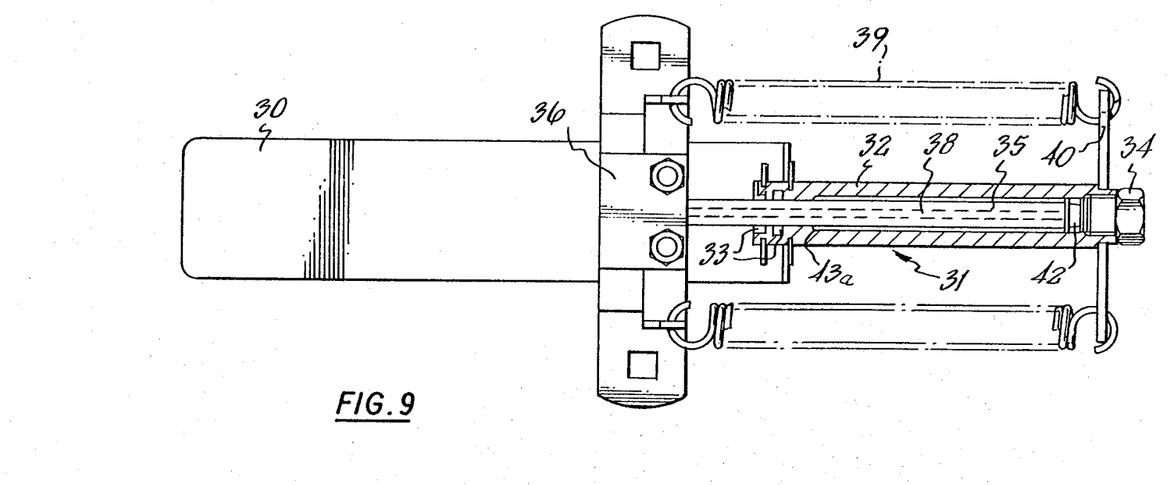
FIGS. 9 and 10 show the constructional details of one of the shutter actuators.
Figure 10:
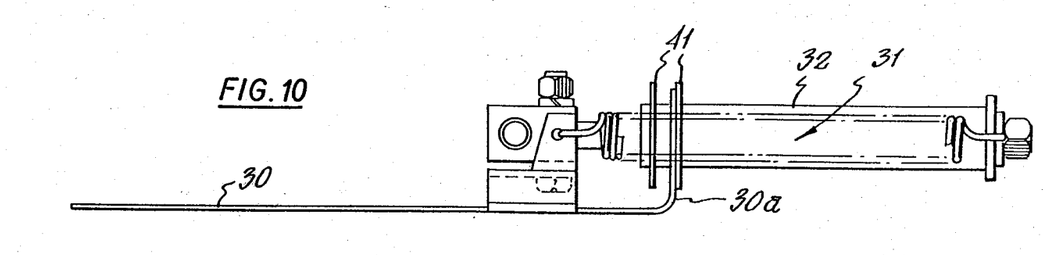

As can be seen more clearly from FIG. 2 in the particular construction described one seed spout and one fertilizer spout on each side of the drill are connected with the tramlining device so that when the tramlining device is operative two rows of seeds and fertilizer granules will be left undeposited thus defining the desired tramlinings in the resultant crop. The distance between these tramlines is chosen to correspond to the track of the tractor drawing the drill and the track of the tractor to be used in subsequent crop treatments such as spraying. The spout shutters 30 associated with the spouts to be acted upon by the tramlining device are adapted to be connected with hydraulic rams 31 whose constructional details are discussed below in relation to FIGS. 9 and 10. Each ram is of a simple and cheap construction comprising a cylinder 32 provided at one end with two o-ring seals 33 and closed at the other end by a sealed bolt 34. A simple hollow rod 35, which is secured to a connecting block 36, extends through the seals 33 onto the interior of the cylinder 32. Each connecting block 36 is arranged to be supplied with pressurized fluid from a valve 37, this fluid passing into the chamber defined between the exterior of the rod 35 and the interior of the cylinder 32 via a drilling 38 in the rod 35. Pressurization of the ram causes the cylinder 32 to move relative to the fixed rod 35 thus drawing the associated shutter 30 to the right as viewed in FIG. 9 against the action of tension springs 39 which are connected between the connecting block 36 and a cross piece 40 carried by the cylinder 32. As can be seen from FIG. 10 the shutter 30 is provided with a right angled portion 30a having an aperture through which the cylinder 32 extends. The cylinder 32 also carries two abutment members 41 between which the right angle portion 30a is located to provide a certain amount of lost motion in the connection between the cylinder 32 and the shutter 30 so that any leakage of pressurized fluid from the cylinder 32 which may occur, either across the valve seat or elsewhere, during the drilling of a particular bout would not result in the unintentional opening of the associated shutter. Over-extension of the ram is prevented by a spring ring 42 which is recessed into the free end portion of the rod 35 and which, when the ram is fully extended acts acts against an abutment 43 provided on the cylinder 32.

Figure 3:
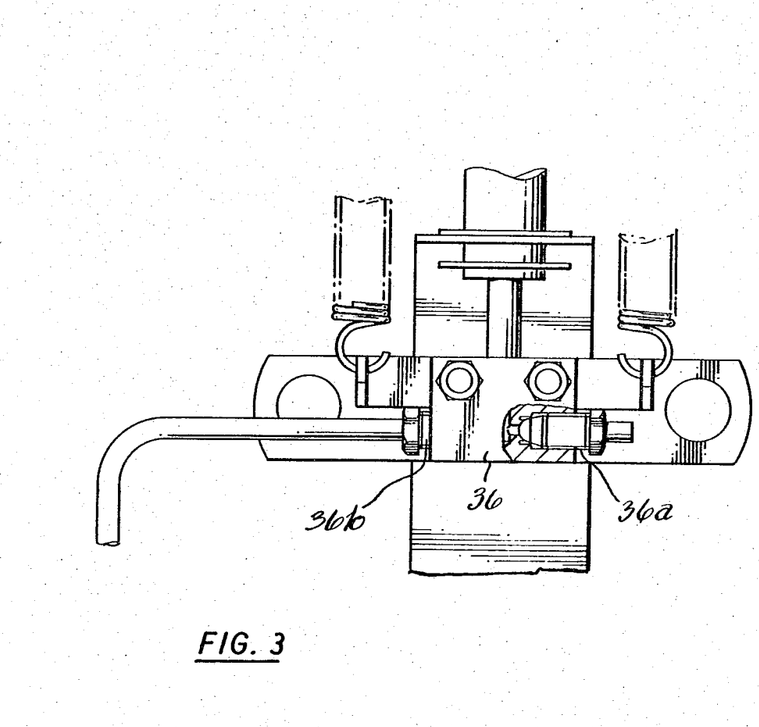
FIG. 3 shows one of the hydraulic connections in detail on a larger scale.
Figure 4:
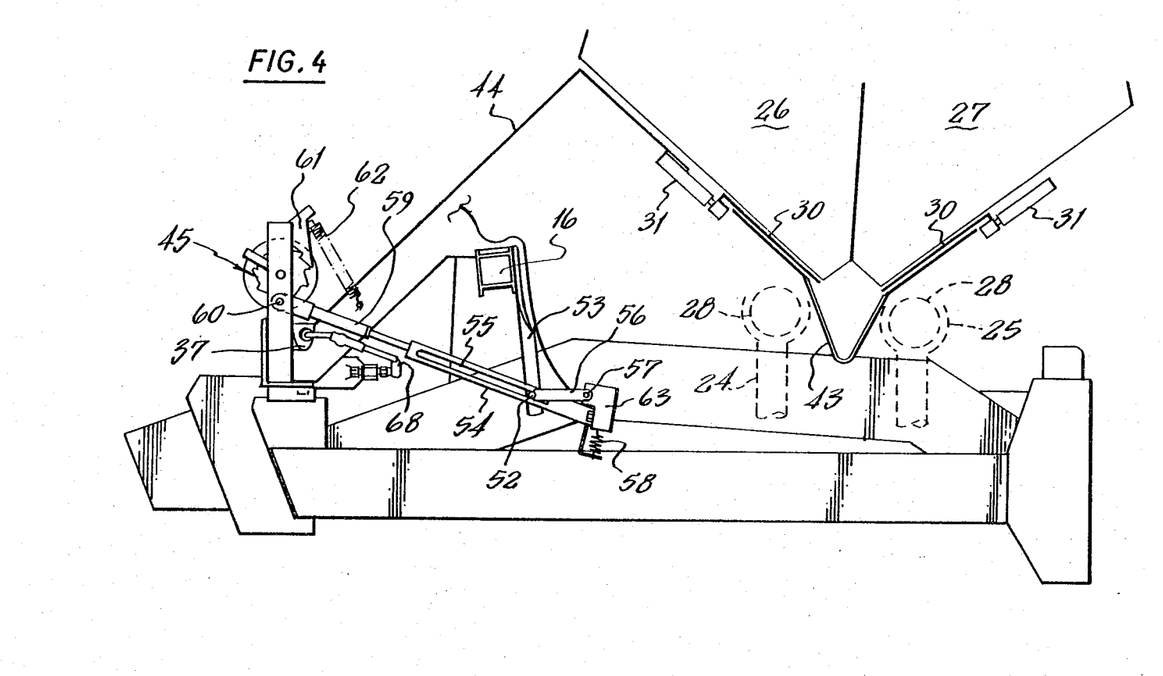
FIG. 4 is a view on arrow A of FIG. 2.
Figure 5:
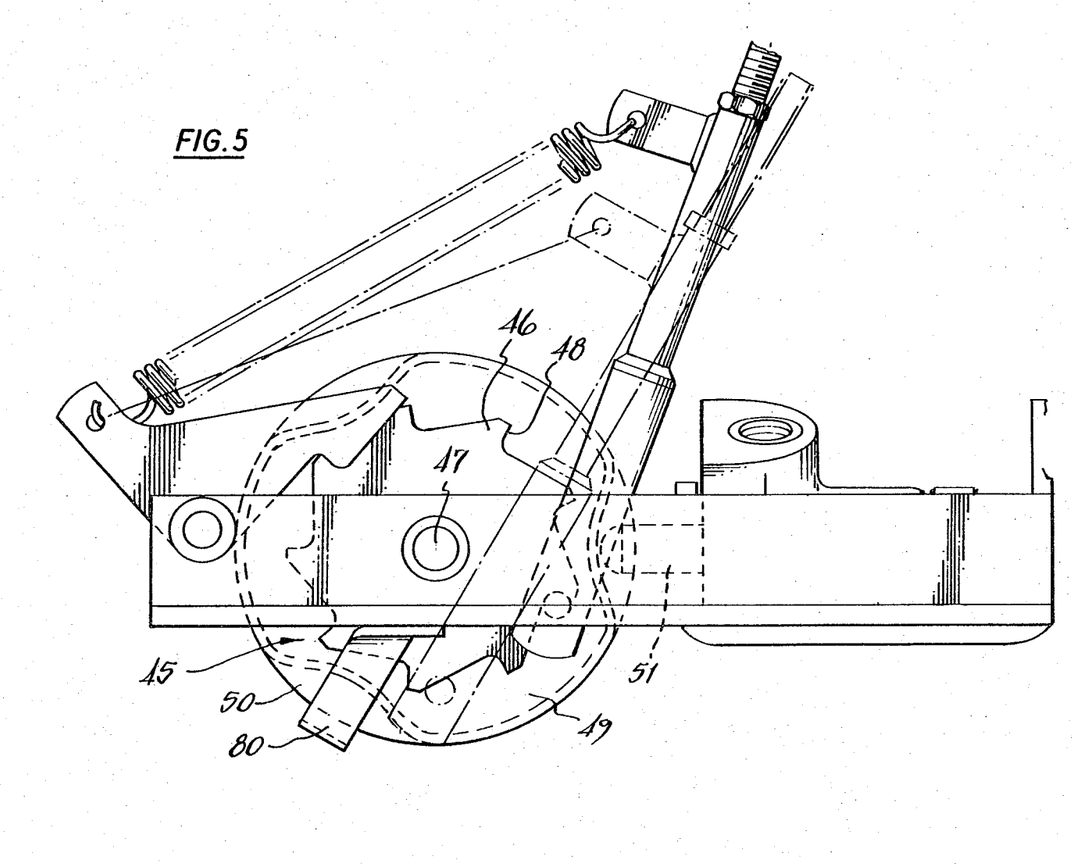
FIG. 5 shows part of FIG. 3 on a larger scale.

As can be seen from FIGS. 2 and 4 each pair of shutters associated with a given coulter assembly are connected in series via conduits 43 which extend between the connecting blocks 36 of the rams and a further conduit 44 connected with the valve 37. Details of the connecting blocks 36 are shown in FIG. 3 which is a view in the direction of arrow D in FIG. 2. Each connecting block has two hydraulic connections 36a and 36b. In the arrangement shown in 3 the connection 36a is blanked off since a series connection to a further ram is not required.

FIG. 4 shows clearly the location of the shutters 30 immediately beneath the seed and fertilizer hoppers 26 and 27. The position of the associated feed wheels below the shutters 30 is shown approximately by the dotted circles 28 in FIG. 4 these feed wheels discharge over spring loaded weirs 44 (see FIG. 1) whose construction and operation is described in more detail in, for example, our previous referred to British Pat. No. 1,274,673. The location of the top of the associated discharge spouts is indicated approximately by the dotted detail 24 and 25 in FIG. 4.

The construction of the valve 37 and the operation of the cam means 45 which controls the valve is best explained with reference to FIGS. 4, 5, 6, 7 and 8.

The cam means 45 comprises a first cam member 46 rotatably mounted on a shaft 47 carried by a bracket 47a secured to the cross bar 14. The cam member 46 is provided with nine teeth or steps 48. A second cam member 49 is secured to the first cam member 46 for co-rotation therewith about the shaft 47. This second cam member has three equally circumferentially spaced recesses 50 into which a plunger 51 which forms part of the valve 37 may extend. The number of steps on the first cam member 46 and depressions 50 in the second cam member 49 depends on the selected tramlining configuration. In the construction under description the tramlining device is set up to tramline on every third bout. Thus the number of steps and depressions is a multiple of three. For different selected tramlining arrangements different numbers of steps and depressions will be required as will be easily understood from the description below of the operation of the device.

The cam means 45 is arranged to be indexed round by an indexing means which includes a first member in the form of a pin 52 mounted on an arm 53 carried by the crossshaft 16 and a second member 54 which includes a slot 55 in which the pin 52 is movable. The second member 54 carries a stop 56 which is pivoted thereon at 57. The stop 56 is biassed into the position shown in FIGS. 4 and 6 by a spring 58. When the stop is in this position clockwise rotation of the cross-shaft 16 as viewed in FIG. 4 causes the pin 52 to abut the stop 56 and hence pull the second member 54 generally to the right as viewed in FIG. 4. The end of the second member 54 remote from the stop 56 is in the form of a rod 59 and carries a further pin 60 which engages the teeth or steps of the first cam member 46.

Thus, as will be appreciated, movement of the second member 54 to the right indexes round the first cam member 46 and thus the second cam member 49 by virtue of the contact between the pin 60 and the steps on the first cam member. This indexing round in a clockwise sense of the cam members is permitted by a locking ratchet 61 which is biassed into contact with the teeth on the first cam member 46 by a spring 62. The locking ratchet 61 prevents rotation of the cam members in a clockwise sense as viewed in FIG. 4. The spring 62 is also arranged to act on the rod portion 59 of the second member 54 to ensure that the pin 60 is maintained in contact with the teeth of the first cam member 46 and snatched behind the next tooth on the first cam member after having being moved to the right by the pin 52 and arm 53.

Figure 6:
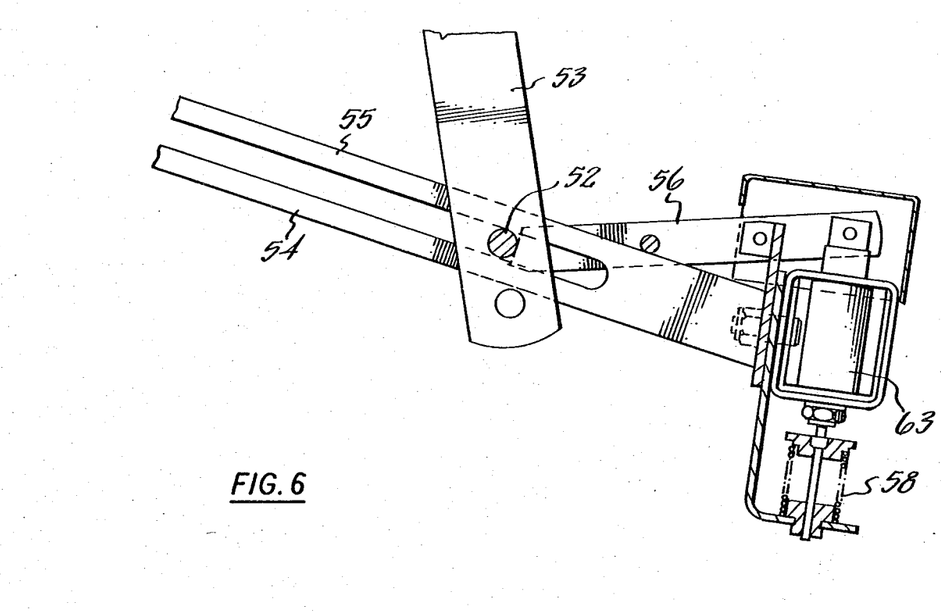
FIG. 6 shows the solenoid-operated override device in more detail and on a larger scale.

A solenoid 63 mounted on a bracket 63a carried by the member 54 forms part of the thrust transmitting path between the stop 56 and the spring 58 and is arranged, when operated by the depression of an illuminated button or switch 64 mounted adjacent the tractor driver's seat, to pivot the stop 56 in a clockwise sense as viewed in FIGS. 4 and 6 against the action of the spring 58 so that the stop is no longer disposed across the slot 55 and rotation of the cross-shaft 16 in an anti-clockwise sense as viewed in FIG. 4 simply results in the movement of the pin 52 further along the slot 55 than was previously permitted without any movement of the second member 54 to the right.

Thus operation of the solenoid 63 overrides the indexing means so that the cam members are not indexed round by one step on the anti-clockwise rotation of the cross-shaft 16.

As will be evident from the above description each anti-clockwise rotation of the cross-shaft 16, which occurs each time the coulter assemblies are raised from their working positions, will be accompanied by the indexing round of the first cam member 46 so that the next tooth is engaged by the pin 60 unless the solenoid override means has been operated.

Figure 7:
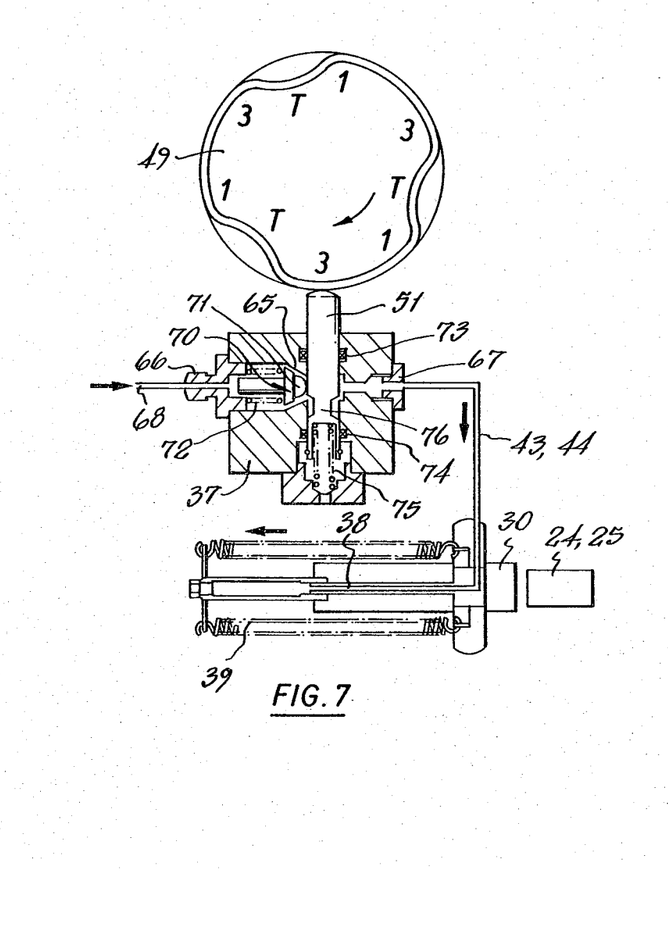
FIGS. 7 and 8 show schematically two different step positions of the cam means and associated valve.
Figure 8:
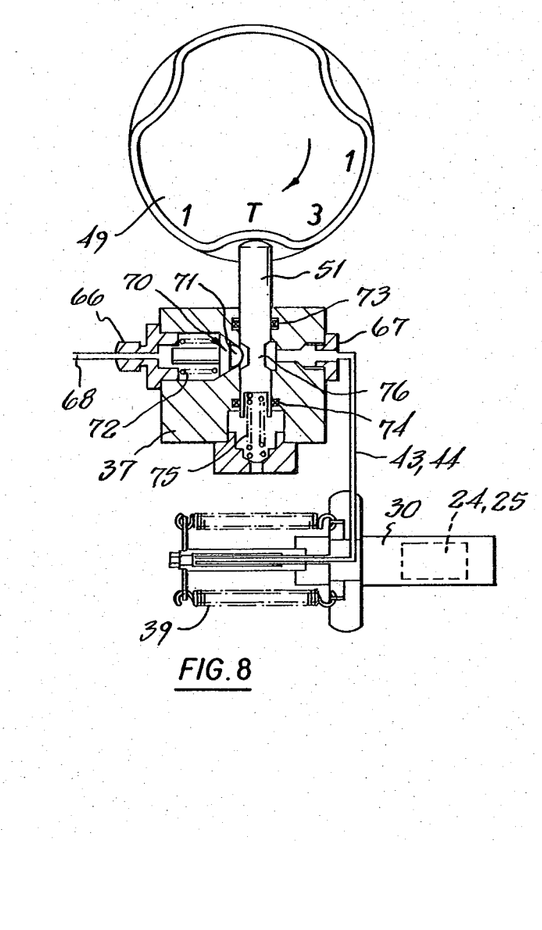

Turning now to the details of valve 37 it can be seen from FIGS. 7 and 8 that the valve includes a conical seat 65 disposed between its inlet and outlet connections 66 and 67 respectively. The valve inlet connection 66 is connected with the main fluid supply pipe 20 via a branch line 68. A supply of pressurized fluid to the branch line 68 from the tractor forces a valve member 70 having a conical head portion 71 towards the seat 65. A biassing spring 72 is also provided to bias the valve member towards this seat.

The previously referred to plunger 51 which co-operates with the second cam member 49 extends into the valve 37 generally at right angles to the line of action of the valve member 70 and is sealed to the valve housing by two rings 73 and 74. The plunger is maintained in contact with the second cam member by a spring 75. The plunger has a waisted portion 76 which, when the plunger has entered one of the depressions 50 in the second cam member is aligned with the nose of the conical valve head 71 so that the valve member can contact the valve seat 51 as shown in FIG. 8. When the plunger is in contact with the second cam member between the depressions 50, as shown in FIG. 7, the waisted portion 76 no longer contacts the nose of the valve member so that the valve member is unseated.

The second cam member 49 is marked with the indices "1" "T" "3" which designate adjacent bouts during the sowing of a particular field.

Figure 11:
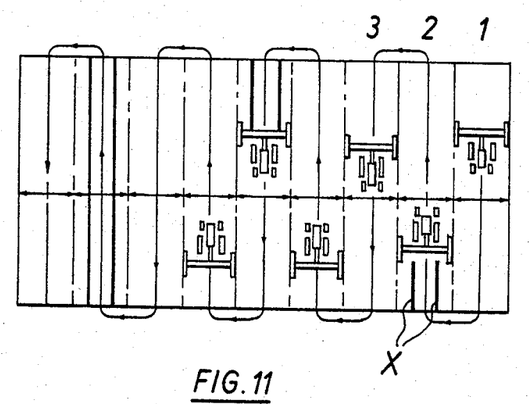
FIGS. 11 and 12 show how the tramlining sequence is generated when sowing a field and used during a subsequent spraying operation.

For example, if the drill coulters have been lowered by pressurizing the cylinders 18 and the drill is moving on a first bout in a field as shown in FIG. 11 then the second cam member will be orientated so that one of the three portions of its periphery designated "1" is contacting the plunger 51 and another of the portions designated "1" is opposite a pointer 80 which is visible to the tractor driver. With the plunger 51 acting against a portion 1 of the second cam member the valve member 70 is unseated and high pressure fluid is conducted to the shutter rams from the tractor hydraulic system to hold the associated shutters open on the four seed and fertilizer spouts controlled by the tramlining device. Thus on the first bout no rows are missed and no tramlines are made.

When the drill reaches the end of the first bout the driver raises the coulter assemblies from their working positions by depressurizing the cylinders 18 so that the springs 22 rotate the cross-shaft 16. As previously explained when the coulters are raised drive is automatically disconnected to the feed wheels 28 and since the pressure supplied to the inlet connection 66 of the valve 37 has now fallen the springs 39 are able to discharge fluid from the associated rams via the valve seat 65 so that the shutters are slid to the closed position.

Also, as explained previously the raising of the coulter assemblies from their working position causes the first cam member 46 to be indexed so that the pin 60 snaps behind the next tooth 48 this has the effect of moving the second cam member so that a portion of its periphery designated "T" is now contacted by the plunger 51 and is also opposite the pointer 80.

When the tractor driver has completed his turn on the field headland he commences the second bout and repressurizes the cylinders 18 thus also supplying pressurized fluid again to the inlet connection 66 of the valve 37. Since the waisted portion 76 of the plunger 51 is now in register with the nose of the valve head 71 the valve is able to make sealing engagement with the seat 65 under the action of the spring 72 and also the inlet pressure. Thus no pressurized fluid passes from the valve 37 to the shutter rams and the four shutters controlled by the tramlining device thus remain closed during this second bout thus defining tramlines X as shown in FIG. 11.

Should the tractor operator encounter an obstacle during this second bout which requires raising of the coulter assemblies from their working position he simply first presses the illuminated button 64 to energize the solenoid 63 and then raises the coulter assemblies. Since he has operated the override solenoid 63, raising of the coulter assemblies does not cause the first cam member 46 to be indexed onto the next tooth since the pin 60 is not moved to the right as the stop 56 no longer extends across the slot 55 and thus there is no force transmitting path from the arm 53 to the second member 54.

When the obstacle has been negotiated the solenoid 63 is switched off by releasing the button 64 which has been held down by a detent in the button and the coulter assemblies are lowered into their working positions by re-pressurizing the cylinders 18 so that the second bout can be continued with the second cam member still in its original position with the plunger 51 engaged in one of the recesses "T".

The tramlining system thus enables the drill operator to negotiate an obstacle which requires the raising of the coulter assemblies from their working positions without indexing the cam means and thus throwing out subsequent operation of the tramlining device.

At the end of the second bout the coulters are again raised from their working position whilst the tractor driver makes the necessary turn to commence the third bout. This raising of the coulters at the end of the second bout indexes the first cam member onto the next tooth so that the plunger now contacts one of the portions of the second cam member designated 3 and on re-pressurization of the cylinders 18 at the commencement of the third bout the associated shutters are held open by fluid pressure in the same manner as when travelling on the first bout. In this manner the field can be completed using the travel pattern shown in FIG. 11 with tramlines X made every third bout.

Figure 12:
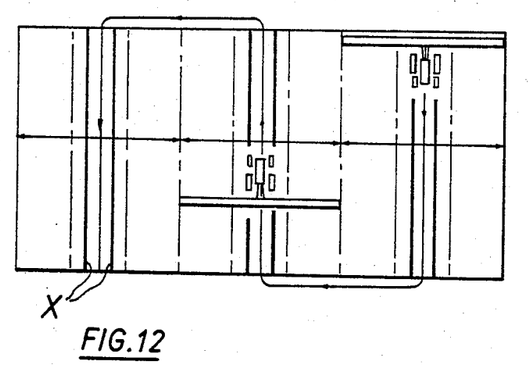

As can be seen from FIG. 12 these tramlines X can conveniently be used in a subsequent spraying operation using, for example, a twelve meter spray boom.

Various modifications to the construction described above are possible. For example, the linkage between the cam means 45 and the cross shaft 16 (constituted by components 52, 54, 55, 56) could be provided by a rod which is slidable within a cylinder and which when the override means is not operative abuts a mechanical stop protruding into the interior of the cylinder to transmit the indexing force to the cam means, the stop being arranged to be moved from the interior of the cylinder to allow the rod to pass further theredown on operation of the override means. In a further alternative linkage arrangement a piston which is axially displaceable within a cylinder may react against a stop in the form of fluid trapped between itself and an end of the cylinder in order to transmit an indexing force to the cam means when the override means is not operative, operation of the override means being arranged to exhaust the trapped fluid and hence remove the index force transmitting path.

Although the override means described above is solenoid operated it will be clear that the function of the solenoid could be undertaken by other electrical, mechanical or fluid pressure operated devices.

Also, it will be appreciated that the cam form of bout indicating means could be replaced by another suitable electrical, mechanical or fluid pressure operated device which counts the bouts.

Further, although the invention has been described above in relation to a trailed drill the same basic principles could be applied to a so-called fully mounted drill carried on a tractor.

It will be evident from the above that the present invention provides a simple and efficient form of automatic tramlining device which meets the modern farmer's requirements.

I claim:

1. A tramlining device for use with a seed drill having a hopper and a series of coulters mounted on a frame with means for raising and lowering said coulters, comprising, bout registering means for registering a number of successive bouts, indexing means responsive to raising of the coulters at the end of successive bouts and operative to index said bout registering means between successive registered bout numbers, individual inhibiting means each adapted to be changed between an inoperative state in which the discharge of seed or other granular material is permitted from a respective drill spout and an operative state in which such discharge is inhibited, and linkage means which responds to selected bout numbers registered by said bout registering means to change the state of said inhibiting means, the linkage means including a separate fluid pressure operated actuator to change the state of each inhibiting means and valve means controlled by the bout registering means for supplying pressurized fluid to said actuator at selected registered bout numbers.

2. A device as claimed in claim 1 in which said actuator is adapted to change the inhibiting means to its operative state when subjected to pressurized fluid, and in which biasing means is provided to return the inhibiting means to its inoperative state when said actuator is depressurized.

3. A device as claimed in claim 1 in which said valve means comprises a valve seat across which the flow of fluid to and from said actuator takes place, a valve member arranged to be acted upon by fluid passing to the actuator so as to be moved toward said seat by such fluid and a plunger separate from the valve member and arranged to be displaceable by the registering means to unseat the valve member to allow the flow of pressurized fluid to the actuator; biasing means being arranged to effect the reverse change of state to that effected by the actuator by forcing fluid from the actuator when the level of pressure supplied by the valve means to the actuator falls from said working level.

4. A tramlining device for use with a seed drill having a hopper and a series of coulters mounted on a frame with means for raising and lowering said coulters, comprising, bout registering means for registering a number of successive bouts, indexing means responsive to raising of the coulters at the end of successive bouts and operative to index said bout registering means between said successive registered bout numbers, inhibiting means adapted to be changed between an inoperative state in which the discharge of seed or other granular material is permitted from an associated drill spout and an operative state in which such discharge is inhibited, and linkage means including at least one fluid pressure operated actuator that is adapted to change the inhibiting means into its operative state when subjected to pressurized fluid and biassing means acting to return the inhibiting means to its inoperative state when the actuator is depressurized.

5. A device as claimed in claim 4 in which said linkage means comprises a plurality of separate fluid pressure operated actuators each adapted to change the state of inhibiting means associated with a respective drill spout.

6. A device as claimed in claim 4 including valve means controlled by the bout registering means for supplying fluid to and exhausting fluid from said actuators at selected registered bout numbers, said valve means including a valve seat across which the flow of fluid to and from said actuator takes place, a valve member arranged to be acted upon by fluid passing to the actuator so as to be moved toward said seat by such fluid and a plunger separate from the valve member and arranged to be displaceable by the bout registering means to unseat the valve member to allow the flow of pressurized fluid to the actuator; and biasing means arranged to effect the reverse change of state to that effected by the actuator by forcing fluid from the actuator when the level of pressure supplied by the valve means to the actuator falls from said working level.

7. A tramlining device for use with a seed drill having a hopper and a series of coulters mounted on a frame with means for raising and lowering said coulters, comprising, bout registering means for registering a number of successive bouts; indexing means responsive to raising of the coulters at the end of successive bouts and operative to index said bout registering means between said successive registered bout numbers; inhibiting means adapted to be changed between an operative state in which the discharge of seed or other granular material is permitted from an associated drill spout and an operative state in which such discharge is inhibited; and linkage means including at least one fluid pressure operated actuator which, when pressurized at a working pressure level, changes the state of the inhibiting means from one of said states to the other, and valve means controlled by the bout registering means for supplying fluid to and exhausting fluid from said actuator at selected registered bout numbers, said valve means including a valve seat across which the flow of fluid to and from said actuator takes place, a valve member arranged to be acted upon by fluid passing to the actuator so as to be moved toward said seat by such fluid and a plunger separate from the valve member and arranged to be displaceable by the bout registering means to unseat the valve member to allow the flow of pressurized fluid to the actuator; and biassing means arranged to effect the reverse change of state to that effected by the actuator by forcing fluid from the actuator when the level of pressure supplied by the valve means to the actuator falls from said working level.

8. A device as claimed in claim 7 in which said linkage means comprises a plurality of separate fluid pressure operated actuators each adapted to change the state of inhibiting means associated with a respective drill spout.

9. A device as claimed in claim 7 in which said actuator is adapted to change the inhibiting means to its operative state when subjected to pressurized fluid, and in which biassing means is provided to return the inhibiting means to its inoperative state when said actuator is depressurized.

10. A device as claimed in any one of the preceding claims which includes a solenoid-operated over-ride mechanism which when operated prevents the indexing of the bout registering means.

11. A tramlining device for use with a seed drill having a hopper and a series of coulters mounted on a frame with means for raising and lowering said coulters, comprising, bout registering means for registering a number of successive bouts, indexing means responsive to raising of the coulters at the end of successive bouts and operative to index said bout registering means between said successive registered bout numbers, inhibiting means adapted to be changed between an operative state in which the discharge of seed or other granular material is permitted from an associated drill spout and an operative state in which such discharge is inhibited, and linkage means which responds to selected bout numbers registered by said bout registering means to change the state of said inhibiting means, and a solenoid-operated over-ride mechanism which when operated prevents the indexing of the bout registering means in response to said changes between successive bouts.

12. A device as claimed in claim 11 including an indexing mechanism in which a first member acts against a movable stop carried by a second member to apply an indexing force to the bout registering means, the solenoid-operated over-ride mechanism serving to move said stop when operated so as to remove the force transmitting path for the indexing of the bout registering means.

13. A device as claimed in claim 12 in which said first member extends within a slot in the second member and the movable stop is arranged to extend across the slot so as to be acted against by the first member when the over-ride mechanism is not actuated, while being moved from its position across the slot when the over-ride means is actuated to allow the first member to move down the slot past the stop without causing the second member to move to index the bout registering means to the next bout number.

* * * * *